UNITED STATES PATENT OFFICE.

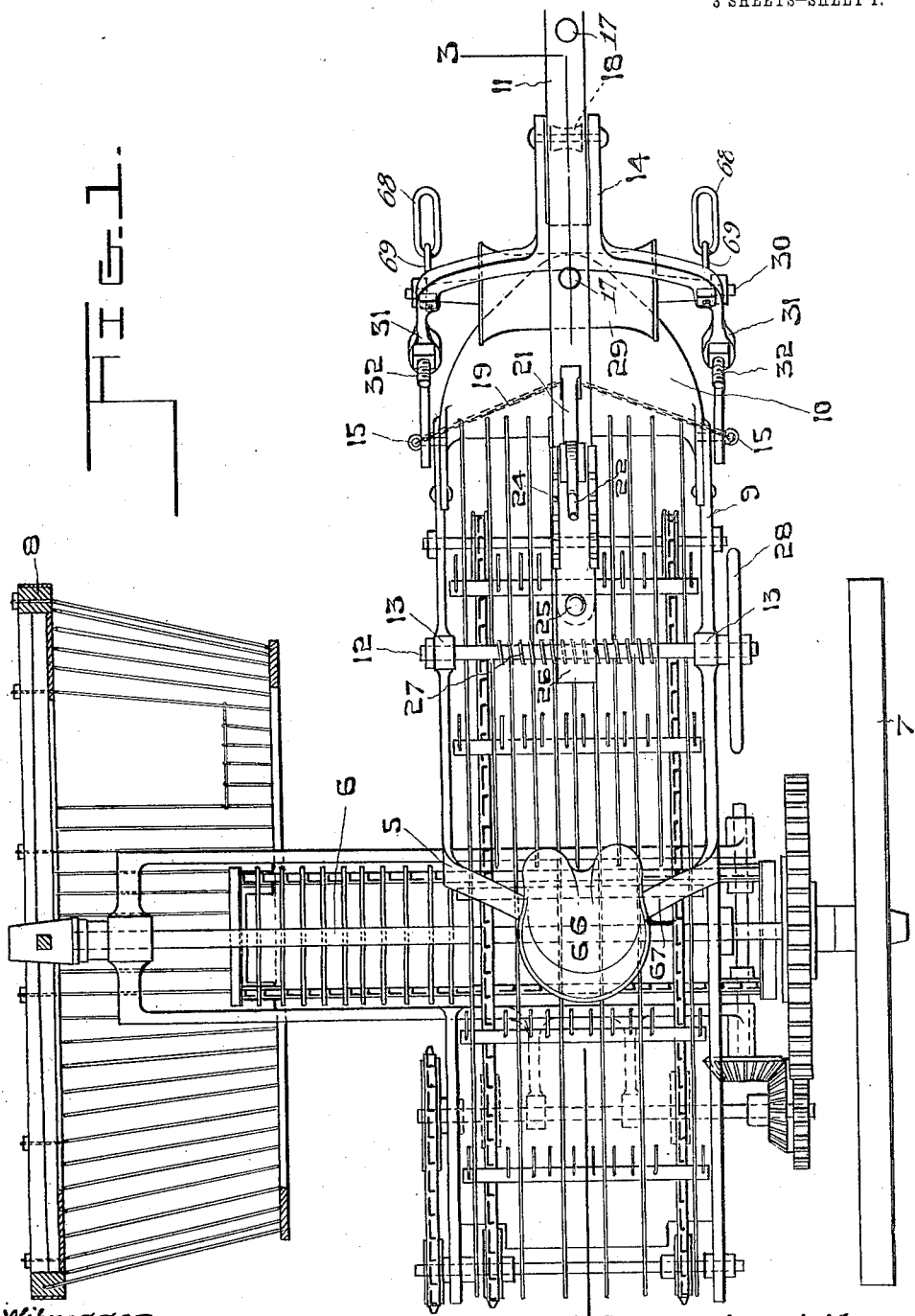

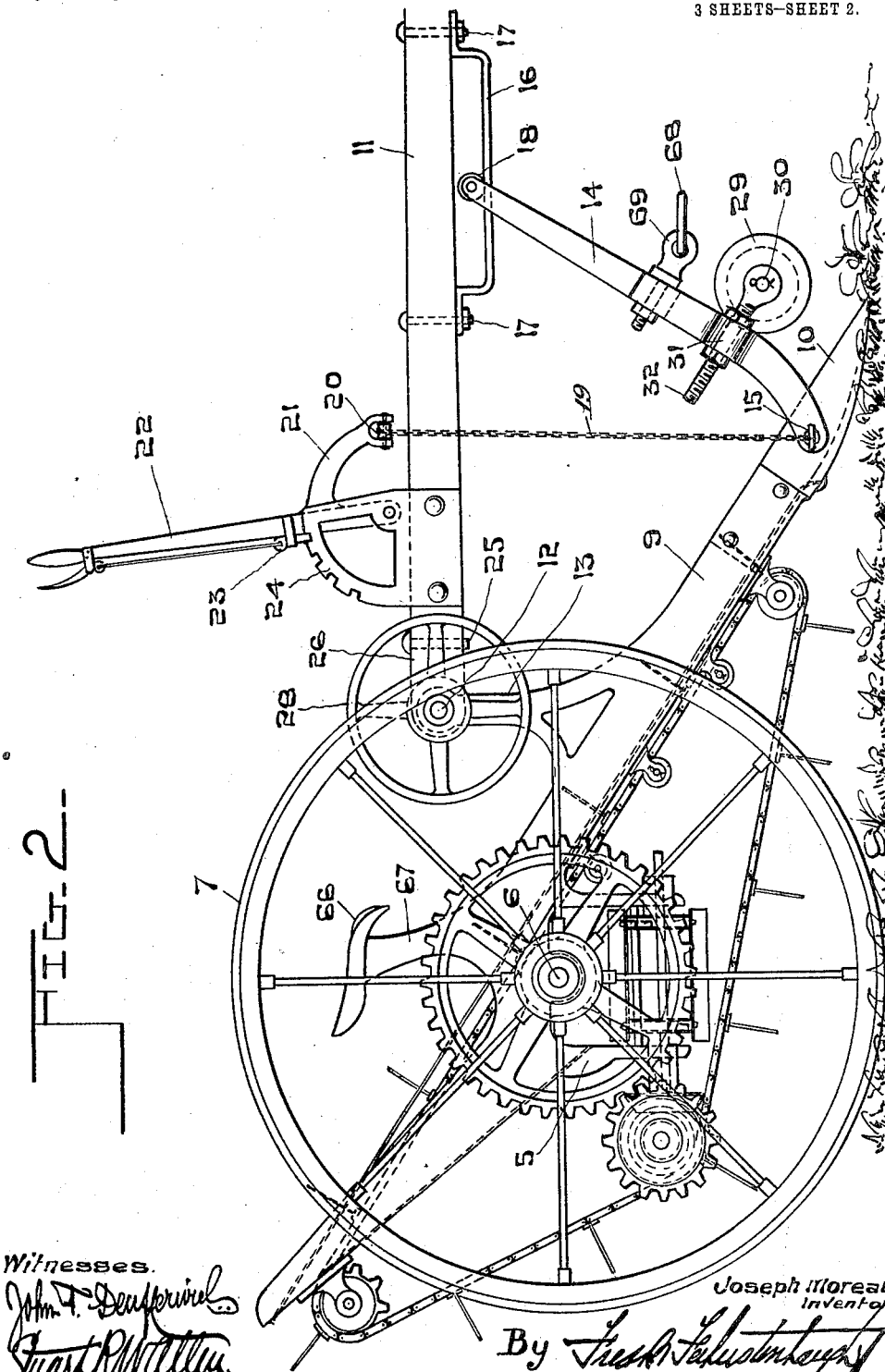

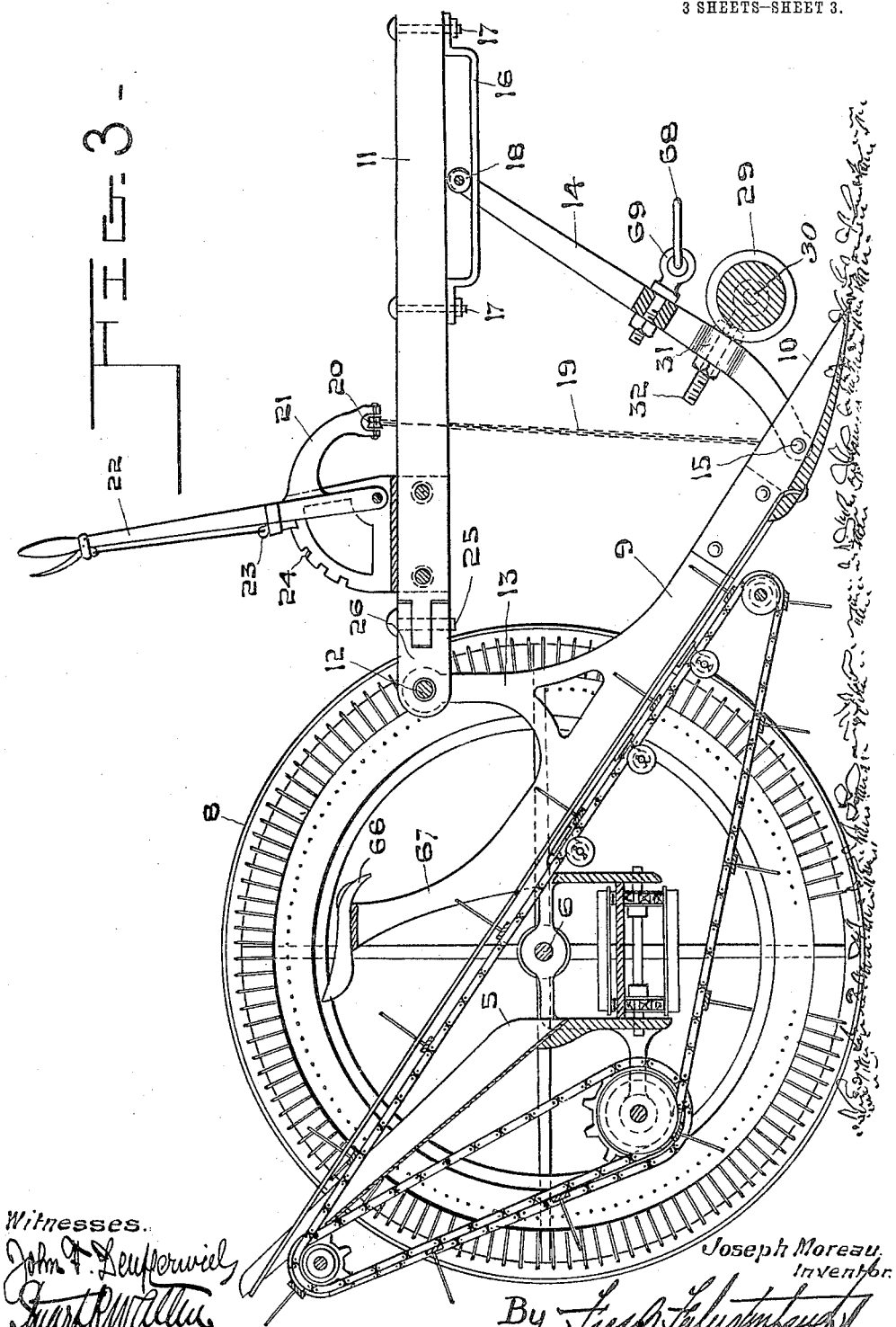

JOSEPH MOREAU, OF ST. GERMAIN DE GRANTHAM, QUEBEC, CANADA.

POTATO-DIGGER.

1,106,669.  Specification of Letters Patent.  Patented Aug. 11, 1914.

Application filed July 22, 1910. Serial No. 573,361.

*To all whom it may concern:*

Be it known that I, JOSEPH MOREAU, of St. Germain de Grantham, in the Province of Quebec and Dominion of Canada, have invented certain new and useful Improvements in Potato-Diggers, of which the following is a full, clear, and exact description.

This invention relates to vegetable harvesting machines and more particularly to a machine of the type generally known as potato diggers.

The main objects of the invention are to provide a simple, compact and efficient machine that will operate automatically to dig the potatoes and remove same from the vines.

The invention consists essentially of a main frame supported upon running wheels. A plow or digging blade is mounted on the main frame having a chute leading upwardly therefrom. Means are provided for adjusting the plow laterally as well as vertically. Means are further provided for separating the potatoes from the vines and roots.

In the drawings which illustrate my invention;—and in which similar numerals of reference refer to similar parts throughout:—Figure 1 is a plan view of the machine. Fig. 2 is a side elevation of same. Fig. 3 is a sectional view on the line 3—3 of Fig. 1.

Referring to the drawings, 5 designates the main frame of the machine which is carried upon an axle 6, on the ends of which are mounted the running wheels 7 and 8. The wheel 8 besides operating to carry the machine on one side, comprises a combined separating, sifting and piling device for the potatoes. Mounted on the main frame is an elevating chute 9, the lower forward part of which comprises a digging blade or plow 10. The main frame is pivotally mounted on the axle 6, while the forward part of the chute is adjustably suspended from the tongue 11 of the machine. The tongue 11 is carried at the inner end upon a shaft 12 mounted in a pair of brackets 13 extending upwardly from the elevator chute 9. The plow or digger blade is supported at its forward end by a forked bracket member or draft yoke 14, which is pivotally attached at its lower end to pins 15 on each side of the plow member, and which is movably mounted at its upper end adjacent the tongue. A track 16 in the form of a stationary bracket is suspended from the tongue by means of the bolts 17 and on this track a roller 18 carried by the upper end of the bracket member, is adapted to slide backward and forward. The plow or blade will thus adjust itself automatically to the character of the ground in which it is operated. In striking a stone or root, for instance, the blade will be thrown upwardly, the bracket support sliding on its track. As soon as the obstruction has been passed over, the blade will return to its former position.

To vertically adjust the blade or plow to its proper depth and to draw same upwardly to an inoperative position, I provide a suspension chain 19 which is attached at its lower ends to the pins 15, or to any other suitable point on the plow. The chain passes over a roller 20 mounted in the forked end of a lever 21 secured to a handle 22 provided with a pawl 23 adapted to engage the notched quadrant 24. The tongue 11 is pivoted at its rear end by means of a pin 25 to a block 26, which is mounted on the spindle 12. The spindle 12 is provided with a worm thread 27 which engages a similar thread in the block 26. The spindle is further provided with a hand wheel 28 and, by turning this hand wheel 28, it will be obvious that the plow may be adjusted laterally with respect to the tongue. For instance, where the rows of potatoes are crooked and it is found impracticable to guide the machine by means of the horses, the frame may be adjusted to one side or the other, as the case may be, to follow the rows of potatoes. In order to prevent the earth from breaking in the center and scattering the potatoes to each side when the plow point is being shoved through the ground, I provide a pressure device 29 consisting of a roller preferably slightly concave at the center. This roller is mounted on an axle 30 journaled at the sides of the forked bracket 14, as indicated at 31. Brackets for journaling this roller preferably consist of adjustable screw members 32 by means of which the roller may be set toward or way from the bracket, as may be desired. This roller is also designed especially to hold the potato vines under pressure while the potatoes are being detached from the roots thereof. It will be understood that many of the potatoes are brought to the surface attached to the roots of the stalks and this pressure roller, which rotates at a slower speed than the elevating device, will hold the vines while the potatoes are being detached and carried upwardly. The vines are then permitted to pass upwardly on the elevating device.

The machine is provided with any suitable seat 66 mounted on the bracket 67 extending upwardly from the frame.

The draft attachment is preferably mounted on the forked member 14 and may consist of any suitable device such as a clevis 68, secured to the eye-bolt 69. By locating the draft device at this point, the plow, which is inclined downwardly into the earth, may always be raised freely and quickly should there be any obstruction in the way. Furthermore, under ordinary conditions of operation, the draft attachment, being approximately midway between the ends of the forked suspension member 14, said member will be maintained at its proper depth in the ground.

The operation of the machine will be obvious for the most part from the foregoing description. The plow point being set at its proper depth by the adjusting devices, the machine will, on being driven forward, start the driving machanism and carrier devices in operation. As the plow enters the ground under the row of potatoes, the pressure roller 29 will hold the stalks or vines in a forward position, while the potatoes and roots are being shoved upwardly on the elevator chute. At this point the fingers or tines 46 will catch the potatoes, disengaging them from the roots, and the potatoes and vines will be gradually carried upward on the elevator.

Although I have shown the preferred form of construction, many changes and modifications may be made in the construction and arrangement of parts without departing from the spirit of this invention.

Having thus described my invention, what I claim is:—

1. A machine of the character described comprising a wheeled framework, an inclined chute, a digging member mounted at the lower end of said chute, a draft yoke pivotally connected to the digging member, and a roller adjustably mounted on said draft yoke above the digging member.

2. A machine of the character described comprising a wheeled framework, an inclined chute, a digging member carried by the chute, a tongue pivotally connected to the chute, a draft yoke pivotally mounted on the digging member, and means on said tongue for adjusting the inclination of the chute.

3. A machine of the character described comprising a wheeled framework, an inclined chute, a digging member carried by the chute, a tongue pivoted to the chute for movement in a vertical plane, a joint in said tongue permitting one portion thereof movement in a horizontal plane, and means for adjusting the angle between the chute and tongue.

In witness whereof I have hereunto set my hand in the presence of two witnesses.

JOSEPH MOREAU.

Witnesses:
STUART R. W. ALLEN,
E. R. MCKENZIE.

---

Copies of this patent may be obtained for five cents each, by addressing the "Commissioner of Patents, Washington, D. C."